US011957079B2

(12) United States Patent
Hall et al.

(10) Patent No.: US 11,957,079 B2
(45) Date of Patent: Apr. 16, 2024

(54) STAND-ON BLOWER

(71) Applicant: Metalcraft of Mayville, Inc., Mayville, WI (US)

(72) Inventors: James Hall, Princeton, WI (US); Craig Antonioni, Lomira, WI (US)

(73) Assignee: Metalcraft of Mayville, Inc., Mayville, WI (US)

( * ) Notice: Subject to any disclaimer, the term of this patent is extended or adjusted under 35 U.S.C. 154(b) by 677 days.

(21) Appl. No.: 16/653,624

(22) Filed: Oct. 15, 2019

(65) Prior Publication Data

US 2020/0120881 A1   Apr. 23, 2020

Related U.S. Application Data

(60) Provisional application No. 62/746,779, filed on Oct. 17, 2018.

(51) Int. Cl.
| *F04D 29/46* | (2006.01) |
| *A01G 20/47* | (2018.01) |
| *F04D 29/44* | (2006.01) |
| *F04D 29/42* | (2006.01) |

(52) U.S. Cl.
CPC ........... *A01G 20/47* (2018.02); *F04D 29/441* (2013.01); *F04D 29/462* (2013.01); *F04D 29/464* (2013.01); *F04D 29/422* (2013.01)

(58) Field of Classification Search
CPC ..... A01G 20/47; F04D 29/441; F04D 29/462; F04D 29/464; F04D 29/422
See application file for complete search history.

(56) References Cited

U.S. PATENT DOCUMENTS

| X557799 | | 4/1896 | Gorter |
| 1,981,099 | A | 11/1934 | Fender |
| 2,140,148 | A * | 12/1938 | Whitmore ........... F04D 15/0022 |
| | | | 415/151 |
| 2,561,882 | A | 7/1951 | Patton |
| 3,074,649 | A | 1/1963 | Atkinson |
| 3,075,813 | A | 1/1963 | Vohl |
| 3,241,253 | A | 3/1966 | McKee |
| 3,303,588 | A | 2/1967 | Krause |
| 3,509,977 | A | 5/1970 | Bacon |

(Continued)

FOREIGN PATENT DOCUMENTS

| CA | 2428625 | 11/2004 |
| CN | 113303178 A * | 8/2021 |

(Continued)

OTHER PUBLICATIONS

"Fradan MTSPB 18VG Push Blower Operator's Manual"; manual; Fradan Manufacturing Corp.; Oct. 17, 2018; 12 pages.

(Continued)

*Primary Examiner* — David E Sosnowski
*Assistant Examiner* — Wayne A Lambert
(74) *Attorney, Agent, or Firm* — Boyle Fredrickson S.C.

(57) ABSTRACT

A stand-on blower is provided that allows for fully powered nozzle angle adjustment. The blower may deliver an airflow for pneumatic cleanup tasks in different directions, including horizontal or left-right and vertical or up-down direction variability of the airflow. Position or angle of the blower's nozzle may be automatically reversed or driven to a rotational or angle limit upon demand.

21 Claims, 7 Drawing Sheets

(56) References Cited

U.S. PATENT DOCUMENTS

| | | | | |
|---|---|---|---|---|
| 3,539,271 | A * | 11/1970 | Greenwood | E01H 1/0809 415/150 |
| 3,583,084 | A | 6/1971 | Farrell | |
| 3,726,029 | A | 4/1973 | Deen et al. | |
| 3,780,455 | A | 12/1973 | Stevenson et al. | |
| 3,808,632 | A | 5/1974 | Aagesen | |
| 3,959,846 | A * | 6/1976 | Yasuda | E01H 1/0836 15/354 |
| 4,023,286 | A | 5/1977 | Cobb | |
| 4,078,365 | A * | 3/1978 | Ingalls | A01D 51/00 15/340.1 |
| 4,118,826 | A * | 10/1978 | Kaeser | A01G 20/47 15/328 |
| 4,227,280 | A * | 10/1980 | Comer | A47L 7/009 29/889.4 |
| 4,391,052 | A | 7/1983 | Guy, Jr. | |
| 4,476,773 | A * | 10/1984 | Fehr | F04D 29/462 415/206 |
| 4,549,365 | A | 10/1985 | Johnson | |
| 4,949,794 | A | 8/1990 | Petit et al. | |
| 5,107,566 | A * | 4/1992 | Schmid | A47L 7/04 56/192 |
| 5,177,888 | A | 1/1993 | Thorud et al. | |
| 5,444,927 | A | 8/1995 | Sosenko | |
| 5,479,730 | A | 1/1996 | Gogan | |
| 5,735,018 | A | 4/1998 | Gallagher et al. | |
| 5,826,416 | A | 10/1998 | Sugden et al. | |
| 5,896,871 | A | 4/1999 | Larsen | |
| 6,058,629 | A | 5/2000 | Peterson et al. | |
| 6,073,305 | A | 6/2000 | Hesskamp | |
| 6,178,668 | B1 | 1/2001 | Gustafson et al. | |
| 6,226,833 | B1 | 5/2001 | Kawaguchi et al. | |
| 6,253,416 | B1 | 7/2001 | Lauer et al. | |
| 6,499,238 | B2 | 12/2002 | Kluck et al. | |
| 6,655,613 | B1 | 12/2003 | Brown | |
| 6,681,443 | B1 | 1/2004 | Bourgeois | |
| 6,685,115 | B1 | 2/2004 | Hardin | |
| 6,718,746 | B2 | 4/2004 | Hettiger et al. | |
| 6,735,814 | B2 | 5/2004 | Franklin et al. | |
| 7,137,578 | B2 | 11/2006 | Steingass et al. | |
| 7,240,891 | B2 | 7/2007 | Hafendorfer | |
| 7,419,106 | B2 * | 9/2008 | Eavenson, Sr. | E01H 1/0809 15/418 |
| 7,448,195 | B2 * | 11/2008 | Kohler | A01D 34/82 56/320.2 |
| 7,506,403 | B2 | 3/2009 | Svoboda et al. | |
| 7,644,777 | B2 | 1/2010 | Combs et al. | |
| 7,703,223 | B2 | 4/2010 | Walker et al. | |
| 7,712,232 | B2 | 5/2010 | Majkrzak | |
| 7,841,044 | B1 | 11/2010 | Weihl et al. | |
| 8,016,098 | B2 | 9/2011 | Saiia | |
| 8,056,180 | B2 | 11/2011 | Iacona | |
| 8,220,849 | B2 | 7/2012 | Beaird, III et al. | |
| 8,387,205 | B2 | 3/2013 | Weihl et al. | |
| 8,579,058 | B1 | 11/2013 | Yamada et al. | |
| 8,827,189 | B2 | 9/2014 | Vanagosoom | |
| 8,938,894 | B2 | 1/2015 | Raasch et al. | |
| 9,003,680 | B2 | 4/2015 | Lee | |
| 9,351,442 | B1 | 5/2016 | Cruz | |
| 9,510,516 | B2 | 12/2016 | Shumaker et al. | |
| 9,560,810 | B2 | 2/2017 | Kinkead et al. | |
| 9,650,024 | B2 | 5/2017 | Weihl | |
| 9,750,180 | B2 | 9/2017 | Pearson | |
| 9,883,634 | B2 * | 2/2018 | Romito | A01G 20/47 |
| 10,267,000 | B2 * | 4/2019 | Olson | E02F 3/7636 |
| 10,299,642 | B2 * | 5/2019 | Buchanan | F04D 27/003 |
| 10,327,392 | B2 * | 6/2019 | Conrad | F04D 17/16 |
| 2003/0082016 | A1 * | 5/2003 | Eavenson, Sr. | A01G 20/47 406/38 |
| 2009/0293321 | A1 | 12/2009 | Walker et al. | |
| 2011/0278088 | A1 | 11/2011 | Weihl et al. | |
| 2012/0241530 | A1 | 9/2012 | Brown | |
| 2012/0246865 | A1 | 10/2012 | Lauer | |
| 2013/0298345 | A1 * | 11/2013 | Romito | A01G 20/47 15/246 |
| 2013/0298351 | A1 | 11/2013 | Romito | |
| 2014/0068892 | A1 | 3/2014 | Chambers | |
| 2014/0157744 | A1 | 6/2014 | Anderson | |
| 2015/0190021 | A1 | 7/2015 | Barkow et al. | |
| 2015/0237808 | A1 | 8/2015 | Prager | |
| 2016/0113207 | A1 * | 4/2016 | Shumaker | B08B 5/02 15/405 |
| 2016/0120131 | A1 * | 5/2016 | Conrad | F04D 25/0673 15/319 |
| 2016/0353951 | A1 * | 12/2016 | Buchanan | F04D 29/422 |
| 2017/0101063 | A1 | 4/2017 | Weihl | |
| 2017/0112071 | A1 * | 4/2017 | Shumaker | A01G 20/47 |
| 2020/0084978 | A1 * | 3/2020 | Weihl | A01G 20/47 |

FOREIGN PATENT DOCUMENTS

| | | |
|---|---|---|
| EP | 0372150 | 6/1990 |
| EP | 2588241 | 5/2013 |
| JP | 1136253 | 2/1999 |
| JP | 3941983 | 7/1999 |

OTHER PUBLICATIONS

"Fradan PB 6RS Push Blower Operator's Manual"; manual; Fradan Manufacturing Corp.; Oct. 17, 2018; 11 pages.

"Fradan VPB 14VG Push Blower Operator's Manual"; manual; Fradan Manufacturing Corp.; Oct. 17, 2018; 11 pages.

"Hurricane Power Stand-On Blower Z3 Manual"; manual; Hurricane Power; Aug. 23, 2017; 4 pages.

"Rad Attachments for Jacobsen Turfcat Three Point Hitch Debris Blower Model 9424B Category B Operator's and Parts Manual"; manual; RAD Technologies Inc.; Dec. 2000; 32 pages; Canada.

* cited by examiner

STAND-ON BLOWER

CROSS-REFERENCE TO RELATED APPLICATIONS

The application claims the benefit of co-pending provisional patent application U.S. App. No. 62/746,779 filed on Oct. 17, 2018 and entitled "Stand-On Blower," the entire contents of which are hereby expressly incorporated by reference into the present application.

FIELD OF THE INVENTION

The invention relates generally to lawn and garden industries and, in particular, to a stand-on blower or a self-propelled blower upon which a user stands while operating, that can pneumatically move leaves and/or other debris from a lawn or other surface.

BACKGROUND OF THE INVENTION

Efforts have been made to reduce manual labor when clearing leaves and for other yard-type waste management tasks that would otherwise require raking, sweeping, and/or other manually intensive labor. These efforts include leaf vacuums that pneumatically pull leaves through an impeller that discharges the leaves into bags or enclosed trailers that can be emptied in a desired location for collecting yard waste. Debris that flows through a leaf vacuum's impeller and passages, such as hoses and/or tubes, between the impeller and the bag or trailer can collect in those passages and plug the flow path between the impeller and the bag or trailer. Plugged passages between the impeller and bag or trailer occasionally need to be manually cleared, which takes time. When the bag or trailer is full, emptying it also takes time.

Other efforts to reduce manual labor when clearing leaves and other yard waste includes stand-on blowers. Typical stand-on blowers have a fixed nozzle direction which requires stand-on blowers to be operated in different travel directions to push leaves or other debris in different directions across a yard or other surface. Some stand-on blowers can deliver airflows in different discrete directions, which allows users to push the leaves or other debris in different directions without changing the stand-on blower's travel direction. This is typically implemented with multiple blower outlets positioned at different locations at the blower, with the outlets facing different directions. The different blower outlets are separately gated with, for example, actuatable plates to allow a user to select which air outlet is active for delivering pressurized air in a corresponding direction. However, the number of airflow paths in these implementations are predetermined and limited to the number of air outlets that are incorporated in the blower's particular design. Geometric constraints of such multiple outlet implementations and their corresponding airflow characteristics tend to create different airflow velocities and/or other airflow characteristics out of the different air outlets, which results in different performance characteristics and inefficiencies, depending on which of the multiple air outlets is active.

SUMMARY OF THE INVENTION

In accordance with a first aspect of the invention, a stand-on blower is provided that allows for fully powered nozzle angle adjustment. The nozzle may be rotated to horizontally sweep an angle of at least 180 degrees for full left-right airflow discharge path variability, and the nozzle may further be vertically adjustable to vary the up-down discharge path of the airflow. Position or angle of the nozzle may be automatically reversed or driven to a rotational or angle limit upon demand. This may be done with a common switch or other input control device that also controls intermediate position adjustability or a separate, dedicated, switch or other input control device.

In accordance with another aspect of the invention, the stand-on blower includes an impeller housing and housing outlet duct that collectively provide a low-profile configuration in a scroll or at least partially spiraling configuration. The blower may generate an accelerated airflow that exits at a flow rate of between about 3,500 cfm (cubic feet per minute) and 6,000 cfm and a velocity of between about 60 mph (miles per hour) and 100 mph, or a flow rate of about 4,500 cfm at about 80 mph; between about 6,000 cfm and 7,000 cfm and a velocity of between about 100 mph and 150 mph, or a flow rate of about 6,500 cfm at about 137 mph; and between about 7,000 cfm and 8,000 cfm and a velocity of between about 150 mph and 200 mph, or less or greater values of either flow rate and/or velocity depending on the particular end-use configuration.

In accordance with another aspect of the invention the stand-on blower includes a chassis with a frame and an engine mounted to the frame. A pair of drive wheels is supported by the frame and selectively receives power from the engine for moving the stand-on blower. A riding platform upon which an operator stands during use is mounted to the frame. The stand-on blower has a blower system with an impeller that selectively receives power from the engine to create an airflow for moving leaves or other debris from a lawn or other surface. An impeller housing surrounds the impeller to direct a volume of air that is accelerated by the impeller in a downstream direction through the blower system as an accelerated airflow. An outlet nozzle is movably mounted relative to the impeller housing and includes a nozzle outlet opening that faces different directions corresponding to movement of the outlet nozzle to direct the accelerated airflow in different directions out of the blower system. A nozzle positioning system is configured to move the outlet nozzle and reposition the nozzle outlet opening to vary the flow direction of the accelerated airflow. The nozzle position system may have multiple operational modes, including full and partial rotation modes. The full rotation mode drives the outlet nozzle to a predetermined rotational limit in response to a full rotation command. The partial rotation mode drives the outlet nozzle to a position that is spaced from the rotational limit in response to a partial rotation command.

In accordance with another aspect of the invention, the full rotation command may be delivered as a single discrete user input, such as a button press, a switch actuation, and a lever actuation. The partial rotation command may correspond to real-time commands to start and stop driving the nozzle, such as pressing, holding, and releasing a momentary switch.

The nozzle rotation system may include a pair of rotational limit devices that limit rotation of the outlet nozzle in opposite directions. A nozzle rotation control input system may provide a first input device that controls the full rotation mode and a second input device that controls the partial rotation mode. The nozzle rotation system may be configured to vary the horizontal facing direction of the nozzle outlet opening about a swept facing direction of at least 180 degrees.

In accordance with another aspect invention, the nozzle positioning system may include a nozzle tilt system that is configured to vary a vertical facing direction of the nozzle outlet opening. A tilt actuator may be configured to pivot the outlet nozzle about a horizontal pivot axis to vary the vertical facing direction of the nozzle outlet opening. The tilt actuator may include a cable that is connected to the outlet nozzle and is configured to push and/or pull the outlet nozzle to pivot the outlet nozzle about the pivot axis.

In accordance with another aspect invention, a deflection system may allow the nozzle to float away from or over an obstacle during a collision by accommodating reactive movement of the nozzle away from a pre-collision position. The deflection system may allow tilting of the nozzle about the nozzle pivot axis in response to the collision. The tilt-adjusting cable may be a pull-only cable configured to move or hold the nozzle when in tension and momentarily bend under compression induced by the tilting of the nozzle during the collision between the nozzle and the obstacle and then restore to its pre-collision form after the collision.

In accordance with another aspect invention, a blower system includes an impeller housing that surrounds the impeller and a housing outlet duct extends between the impeller housing and the outlet nozzle. The housing outlet duct may define a duct body that extends in a scroll fashion from the impeller housing. The duct body may include a housing outlet duct inlet end that extends tangentially from the impeller housing and a housing outlet duct outlet end arranged forward of the housing outlet duct inlet end and the impeller housing.

In accordance with another aspect invention, a ball-and-socket joint may provide an interface between the housing outlet duct outlet end and the nozzle.

Figure 1:
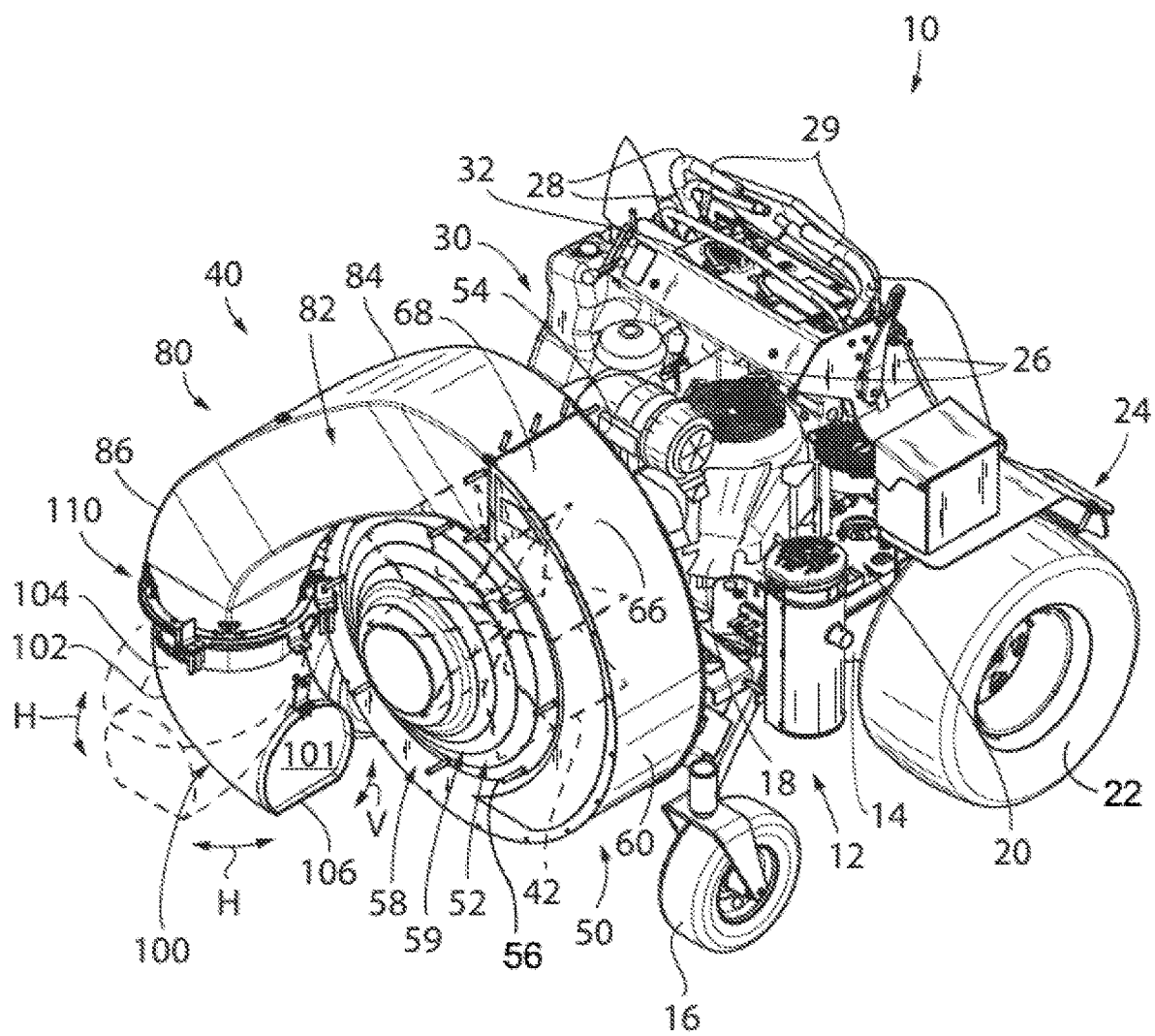
FIG. 1 is a partially schematic pictorial view of a stand-on blower in accordance with an aspect of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to the drawings and initially to FIG. 1, a stand-on blower is shown as blower 10 that can be used for clearing leaves, dust, dirt, and/or other debris from yards or other surfaces. As described in greater detail elsewhere herein, the blower 10 can deliver an airflow for such pneumatic cleanup tasks in different directions, including horizontal or left-right and vertical or up-down direction variability of the airflow. Blower 10 includes a chassis 12 with a frame 14 that supports various components and systems of the blower 10. Casters 16 are undriven and are pivotally attached to a front portion of frame 14. Powertrain components are mounted to frame 14, such as engine 18 that delivers power used by the systems of blower 10, such as a hydraulic drivetrain 20. Hydraulic drivetrain 20 includes at least one hydraulic pump that receives power from engine 18 and a hydraulic control valve system that selectively and variably provides pressurized hydraulic fluid to hydraulic motors that correspondingly selectively and variably rotate drive wheels 22. Blower 10 is shown with a zero-turn configuration, in which the drive wheels 22 may be rotated in opposite directions and the same rate to pivot the blower 10 about a vertical axis to achieve a zero-turn maneuver. A riding platform 24 is mounted to the frame 14 toward the back or at a back end of the blower 10 and provides a support surface upon which an operator stands while using the blower 10. A pair of uprights 26 extend upwardly from the back end of blower 10 and supports grab bars or front and rear reference bars 28 that may provide mechanical limits or stop against which hand control levers 29 can be moved toward or against for driving and steering. Hand control levers 29 are connected to the hydraulic control valve system so that moving each lever 29 controls a respective drive motor and rotation of its corresponding drive wheel 22. A control system 30 has various of its components mounted in a panel 32 that is supported by the uprights 26, some of which are used to control a blower system 40.

Still referring to FIG. 1, blower system 40 includes impeller 42 that has blades that extend radially from a hub which is driven by the engine 18. Adjacent radially extending blades are connected to each other with triangular braces that are also connected to the hub and extend perpendicularly between respective surfaces of adjacent pairs of impeller blades. The triangular braces may be arranged closer to backside or inner edges of the impeller blades, toward engine 18, than frontside or outer edges or the impeller blades, away from engine 18. A ring or ring-shaped brace may connect the frontside or outer edges of the impeller blades to each other. Impeller 42 is mounted vertically and defines a horizontal rotational axis. Impeller 42 may be driven by the engine 18 through a drive belt system 44 with at least one belt(s) 45 that is selectively rotated by way of a clutch pulley such as an electromagnetic clutch 46 or other clutching mechanism. If a vertical shaft engine 18 is implemented with drive belt system 44, then a direction-changing mechanism is used to change the orientation of the belt(s) from horizontal at the engine 18 output to vertical at the impeller input, such as a 90-degree gearbox or mule-drive type pulley arrangement.

Figure 2:
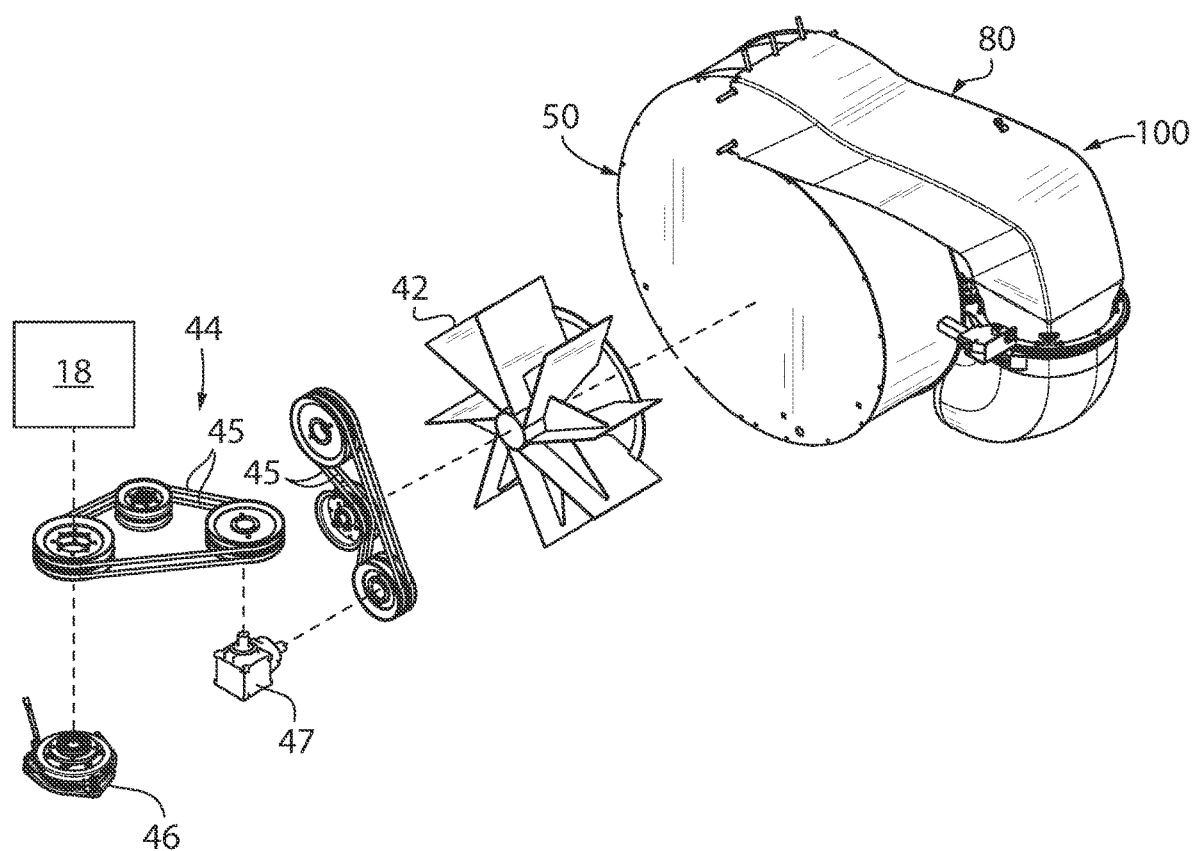
FIG. 2 is a partially schematic exploded view of portions of a blower system in accordance with an aspect of the invention.

Referring now to FIG. 2, an example of a direction-changing mechanism and drive belt system 44 is shown with a first pair of horizontal belts 45 that selectively receive power by way of electromagnetic clutch 46. The horizontal belts 45 deliver power to a vertical input shaft of 90-degree gearbox 47, which delivers power through a horizontal output shaft to vertical belts 45 that rotate impeller 42. Selectively delivering power to rotate impeller 42 through electromagnetic clutch 46 allow engine 18 to be started without rotating the impeller 42, which reduces the load on the engine's electric starter motor. Disengaging electromagnetic clutch 46 also allows stopping rotation of impeller 42 and airflow from blower 10 as desired by the user, for example, when loading and unloading blower 10 into and out of an enclosed trailer or driving blower 10 into and out of a storage building. It is contemplated that the impeller 42 could be hydraulically driven instead of belt driven.

Referring again to FIG. 1, impeller 42 is mounted in a cavity of an impeller housing 50 that surrounds the impeller 42. Impeller housing 50 includes interconnected housing walls that surround the impeller housing cavity 52. The walls include a flat back wall 54 at a back side of the impeller housing 50 that faces engine 18 and has a generally circular perimeter shape and may have venting holes or slots in it, for example, toward its middle portion near the hub of impeller 42. A flat front wall 58 is at a front side of the impeller housing 50, facing away from engine 18. Front wall 58 has a generally circular perimeter shape and defines an impeller housing inlet 56 with an opening(s) for receiving intake air into the impeller housing cavity 52. Grill 59 allows air to flow through it while covering or overlying the impeller housing inlet 56. Grill 59 is shown here as a series of planar rings of decreasing outer and inner diameters that are axially spaced apart and concentrically arranged from an end view, with a solid planar disc in the middle and outermost position. Circumferential sidewall 60 extends between and interconnects the outer perimeters of the back and front walls 54, 58 to circumferentially surround the impeller housing cavity 52. Impeller housing outlet 66 is defined at least partially through the circumferential sidewall 60 and presents an impeller housing outlet opening 68 that is tangential with respect to the impeller 42. This provides a flow path of air through impeller housing 50 that enters the housing axially through the impeller housing inlet 56 in front wall 58, is pressurized and accelerated by impeller 42 within the housing 50, and then exits the housing 50 as an accelerated airflow tangentially through the impeller housing outlet 66.

Still referring to FIG. 1, a housing outlet duct 80 extends away from the impeller housing 50. The housing outlet duct 80 has a duct body 82 that defines a housing outlet duct inlet end 84 that is connected to and receives the accelerated airflow from the impeller housing outlet 66. A housing outlet duct outlet end 86 of the duct body 82 delivers the accelerated airflow out of the housing outlet duct 80 in a downstream direction. The duct body 82 is shown extending tangentially away from the impeller housing 50 and also angularly in a forward direction, and in front of the impeller housing 50, which provides an at least partially scrolling spiraling configuration to the impeller housing 50 and housing outlet duct 80. In this way, the housing outlet duct inlet and outlet ends 84, 86 are axially spaced from each other relative to a rotational axis of the impeller 42.

Still referring to FIG. 1, an outlet nozzle 100 is movably mounted to the duct outlet end 86 and is therefore also relative to the impeller housing 50. Nozzle 100 includes a nozzle outlet opening 101 that faces different directions corresponding to movement of the nozzle 100 to direct the accelerated airflow in different directions out of the blower system 40. Nozzle 100 has a nozzle body 102 within inlet end 104, shown as its upper end, and an outlet end 106, shown as its lower end that defines the nozzle outlet opening 101. Nozzle body 102 is shown in an elbow configuration, curving approximately 90 degrees between its upper and lower or inlet and outlet ends 104, 106. Nozzle direction system or nozzle positioning system 110 is configured to move the nozzle 100 and reposition the nozzle outlet opening 101 to vary the flow direction of the accelerated airflow, as controlled by the user. Nozzle positioning system 110 includes a nozzle rotation system 112 (FIGS. 3-4) that controls horizontal or left-right movement of the nozzle 100 as represented by arrow(s) "H" and a nozzle tilt system 114 (FIGS. 4-5) that controls vertical or up-down movement of the nozzle 100 as represented by arrow "V".

Figure 3:
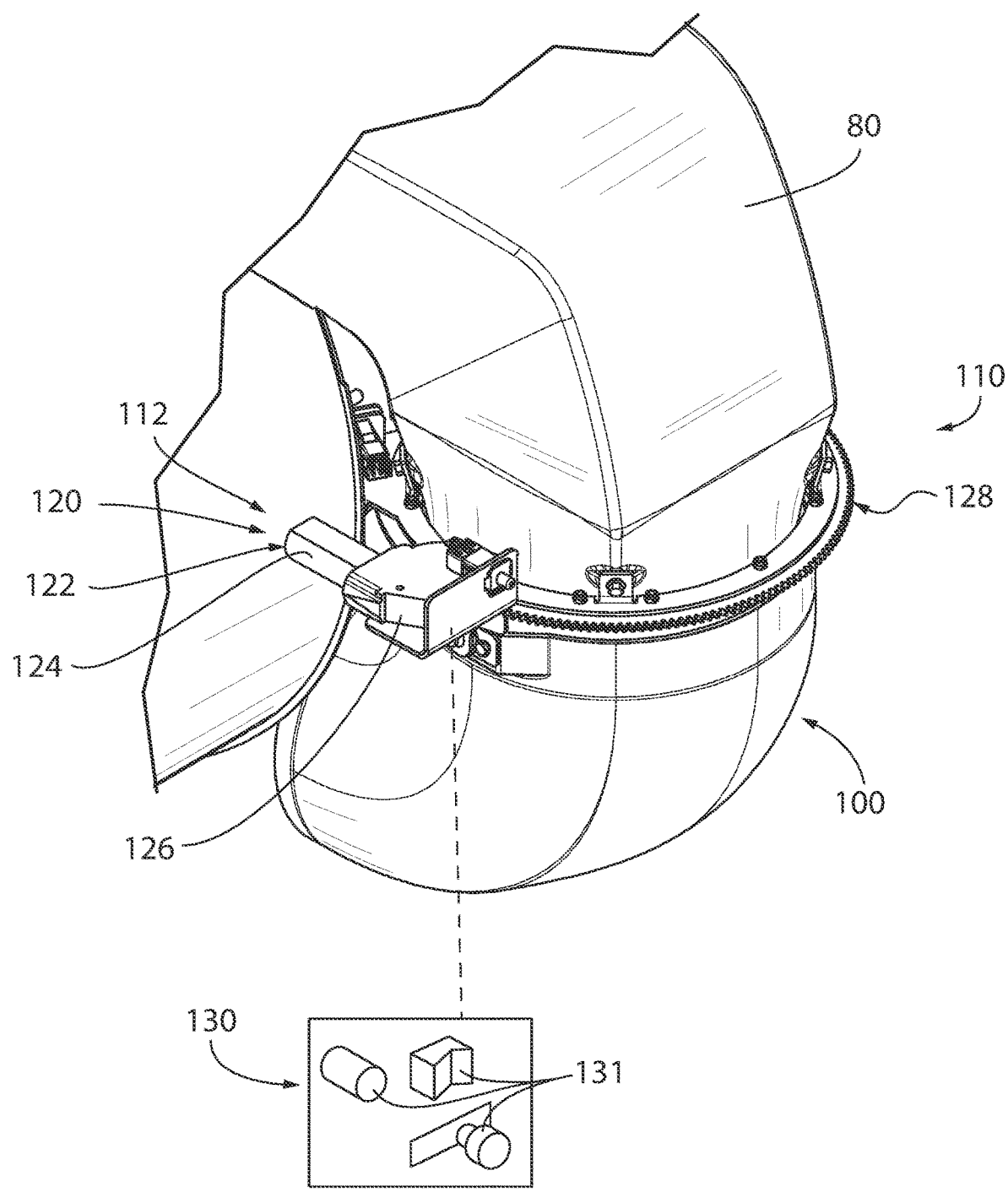
FIG. 3 is a pictorial view from above and behind portions of a nozzle positioning system in accordance with an aspect of the invention.

Referring now to FIG. 3, nozzle rotation system 112 includes a rotation actuator 120 that is configured to drive rotation of the outlet nozzle 100 about a vertical axis to vary the horizontal or left-right facing direction of the nozzle outlet opening 101, providing a fully-powered nozzle angle adjuster. Rotation actuator 120 may include a rotation drive 122, shown here with an electric motor 124 and gear-train 126 that may have a worm gear, spur gear, or other gear, that drives a cooperating gear on the nozzle 100, shown here as a ring gear 128 that is mounted to the nozzle inlet end 104. Rotating ring gear 128 in either direction with the rotation drive 122 correspondingly rotates the nozzle 100 in either direction to change or vary the horizontal or left-right facing direction of the nozzle 100 and airflow released through it. A first set of nozzle controls of control system 30 includes a nozzle rotation control input system 130 that provides a user interface for controlling the nozzle rotation system 112. The rotation control input system 130 includes at least one input or control device 131 such as a switch, a knob, a handle, a button, or a lever that can be manipulated to control the horizontal or right-facing direction of the nozzle 100 by rotating the nozzle 100 about its vertical axis.

Figure 4:
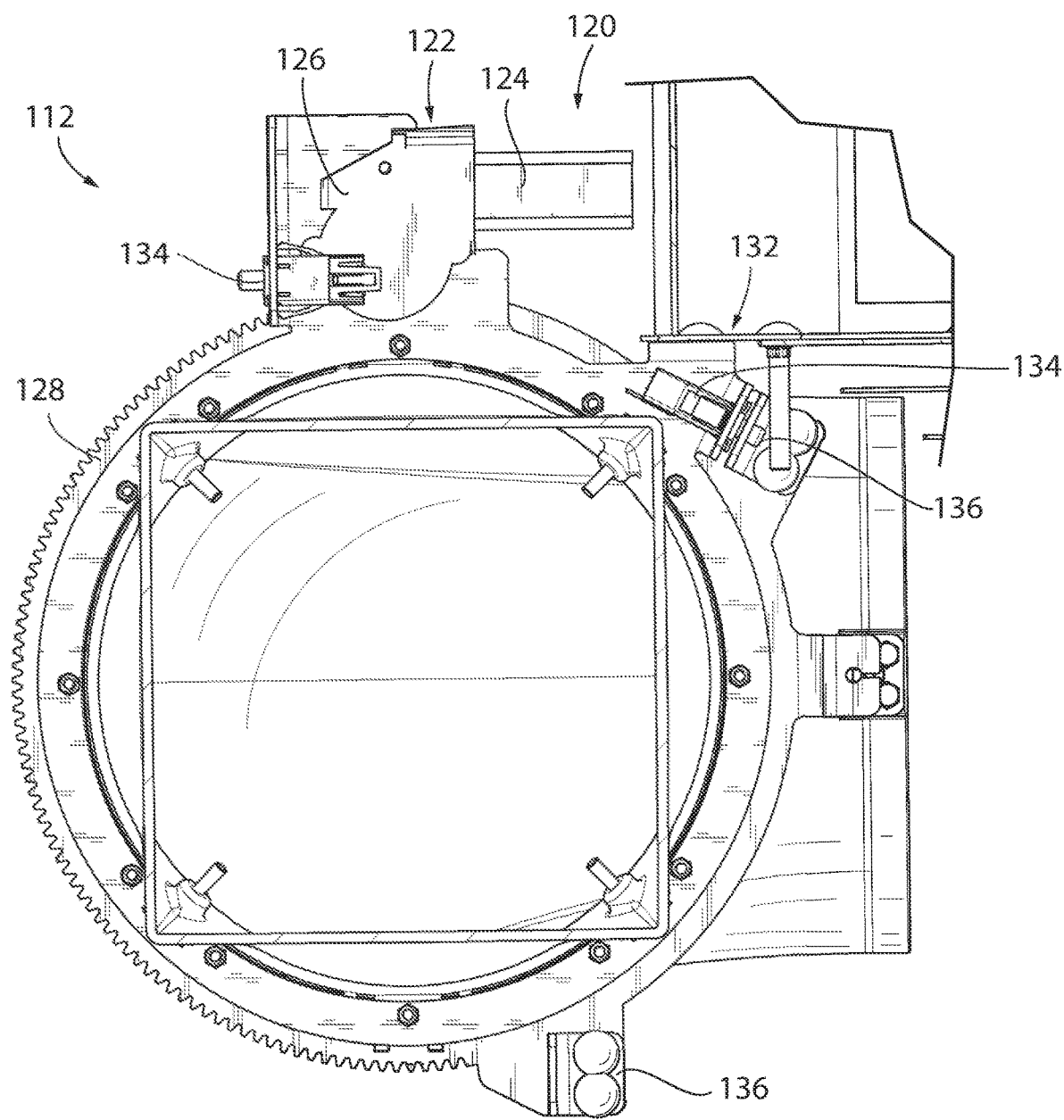
FIG. 4 is a cross-sectional and top plan view of portions of the nozzle positioning system of FIG. 3.

Referring now to FIG. 4, nozzle rotation system 112 is shown with a pair of rotational limit devices 132 or stops that prevent further rotation beyond their positions. Each of the rotational limit devices 132 includes an electronic limit switch 134 that is mounted in a fixed position, shown here mounted to the housing outlet duct 80. The two electronic limit switches 134 are arranged horizontally, with their plungers facing away from each other. Each of the rotational limits devices 132 also includes a stop bracket 136 and is configured to engage and depress respective plunger of a respective limit switch to deenergize the motor of the nozzle rotation drive 122 and stop rotation of the nozzle 100. The stop brackets 136 are shown mounted to rotation unison with ring gear 128. It is understood that the mounting positions of stop brackets 136 can be adjusted to correspondingly adjust the rotational range of motion of the nozzle 100. In this way, a predetermined rotational limit of the nozzle positioning system 110 can be defined and redefined by changing the positions of the stop brackets 136 with respect to each other and their respective limit switch 134. The rotational range of motion or swept facing direction of nozzle 100 may be at least 180 degrees, for example, approximately 200 degrees of left-right horizontal swept rotational travel. The nozzle rotation system 112 provides multiple movement modes that can be accessed and controlled through the rotation control input system 130 to drive rotation of nozzle 100 to a desired position and the rotation. A full rotation mode allows turning nozzle 100 to a full left or right position in response to a full rotation command. The full rotation command may be delivered by the user with a single-press or other single command, without maintaining a constant pressure on a momentary switch or otherwise requiring constant input from the user. In the full rotation mode, the nozzle rotation system 112 drives the nozzle 100 to a selected one of the rotational limit devices 132 or maximum rotational position in response to, for example, a single discrete user input through the nozzle rotation control input system 130. In this way, automatic reversal of nozzle's angle upon demand can be achieved by a discrete command such as a switch or knob actuation or lever full-pivot movement or the like. This may be a dedicated control device or a unique command through a common switch, lever, or other control device that may also be used to control and move the nozzle 100 to other than the full rotation mode or the rotation limit positions. A partial rotation mode allows the nozzle 100 to be rotated to and stop at a position between the rotational limit positions. In this way, nozzle 100 may be driven to a user-selected position that is, for example, spaced from the outlet nozzle's predetermined rotational limit in response to a partial rotation command. A momentary switch or the like may be implemented to drive the rotation of nozzle 100 to such intermediate position(s) by energizing the motor of the nozzle rotation drive 122 to a desired position and then deenergize the motor and stop rotation of the nozzle 100 at the desired intermediate position. The partial rotation command may be given real-time by the user pressing or otherwise actuating, for example, a momentary switch implementation of the control device 131. This energizes the rotation drive 122 until desired nozzle position is achieved and then the user releases the switch as a stop driving command to de-energize the rotation drive 122 and hold the nozzle 100 in the desired partially rotated position. Rotation control input system 130 may use the same input device(s) for controlling both the full and partial rotation modes, or separate devices may be implemented, such as a first input device that controls the full rotation mode and a second input device that controls the partial rotation mode.

Figure 5:
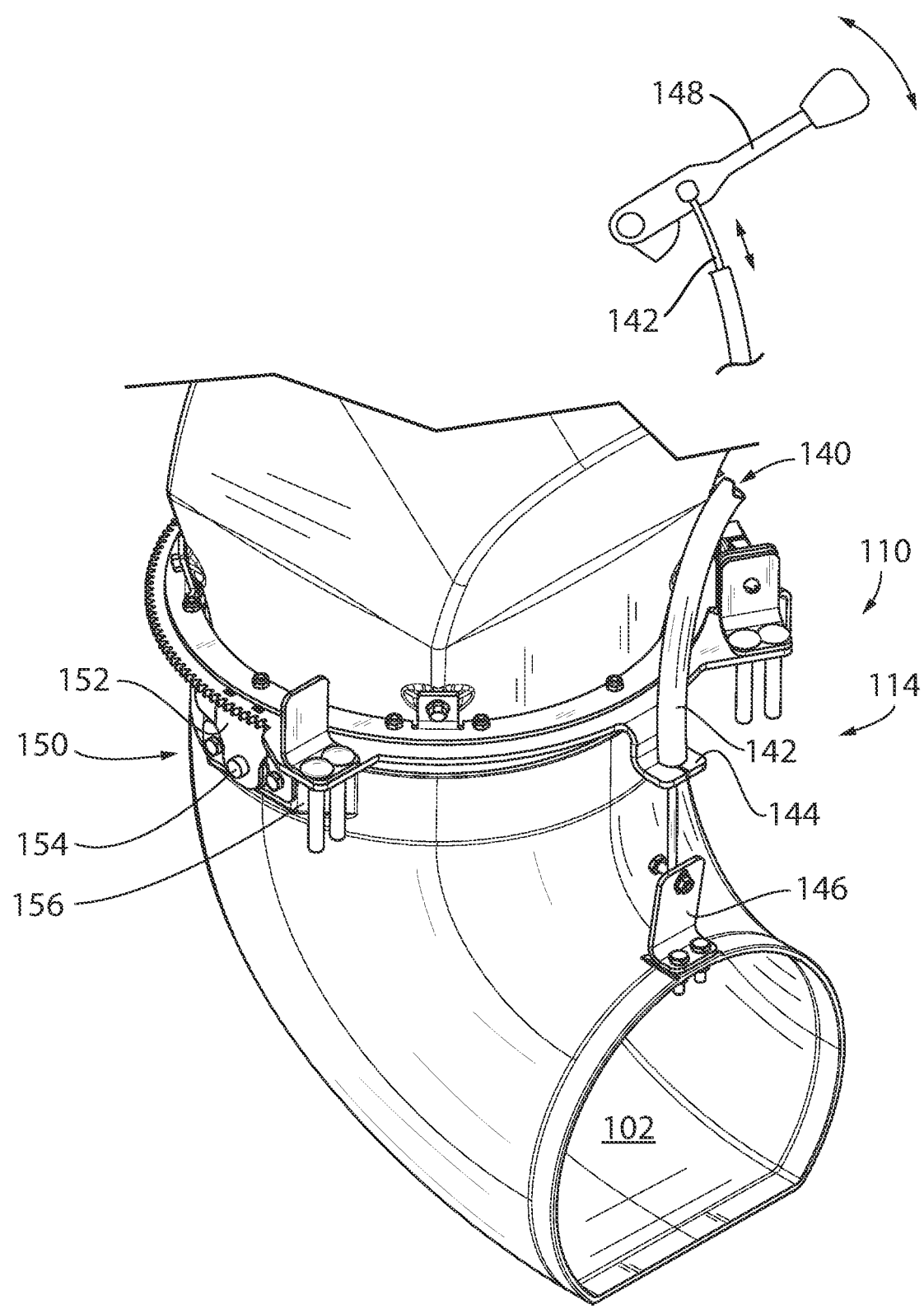
FIG. 5 is a pictorial view from above and in front of portions of the nozzle positioning system of FIG. 3.

Referring now to FIG. 5, nozzle tilt system 114 includes a tilt actuator 140 that is configured to pivot the outlet nozzle 100 about a horizontal pivot axis to vary the vertical or up-down facing direction of the nozzle outlet opening 101. Tilt actuator 140 is shown here as a manual actuator device, with a mechanical control cable, shown as cable 142. Cable 142 is connected to nozzle 100 and configured to push and/or pull the outlet nozzle 100 to pivot the outlet nozzle about the pivot axis. Base cable bracket 144 is mounted to ring gear 128 so that the base cable bracket 144 is fixed vertically, but it rotates in unison with ring gear 128 and nozzle 100 about its vertical axis. End cable bracket 146 is mounted to an upper wall of the nozzle 100, shown directly above nozzle outlet opening 101, and secures a movable end of the cable 142 for movement in unison with the outer end of nozzle 100. In this way, pulling cable 142 in will draw the end cable bracket 146 and the outer end of nozzle 100 toward the base cable bracket 144, which lifts the outer end of nozzle 100 to tilt upwardly for a more upwardly directed flow path of the accelerated airflow. Pushing cable 142 in will push the end cable bracket 146 and the outer end of nozzle 100 away from the base cable bracket 144, which lowers the outer end of nozzle 100 to tilt downwardly for a more downwardly directed flow path of the accelerated airflow.

Still referring to FIG. 5, instead of a push/pull cable, cable 142 may instead have a pull-only configuration, such as a braided inner cable within an external sleeve that is substantially flexible to pull the nozzle 100 to tilt upwardly. Downward tilting of nozzle 100 in a pull-cable implementation of cable 142 may be achieved at least partially gravitationally by the weight of the nozzle 100 and/or a downward force on the nozzle 100 introduced by the airstream flowing through the nozzle 100. The flexible inner cable of a pull-cable implementation of cable 142 has a sufficiently low columnar strength in a pushing direction to fold or collapse in preference to permanently bending when nozzle 100 deflects upwardly during collisions with obstacles. This allows nozzle 100 to float up and over obstacles and restore to its previous tilt-position without kinking or permanently bending cable 142.

Still referring to FIG. 5, a cable lever or nozzle tilt control lever 148 may be mounted on the panel 32 (FIG. 1), which can be pivoted to push and/or pull the cable 142 and correspondingly tilt the nozzle for vertical or up-down variation of the accelerated airflow's flow direction. Nozzle tilt control lever 148 may have a cam-like plate or other movable surface(s) in face to face engagement with a fixed surface of a bracket or other blower 10 component to provide a frictional engagement that holds nozzle tilt control lever 148 and correspondingly nozzle 100 in a position selected by the user. It is understood that instead of a sandwiched or other frictional engagement of portions of nozzle tilt control lever 148 to selectively hold its position in an infinitely adjustable manner, nozzle tilt control lever 148 may be instead mounted in a gated passage that provides discrete positions of the nozzle tilt control lever 148 and nozzle 100. Although described as a cable, it is understood that the tilt actuator 140 may be a different actuator mechanism, such as an electronic actuator or the like capable of tiling the nozzle 100. The pivot axis of nozzle 100 may be defined through a pair of pivot joints that include pivot brackets 150. Each bracket 150 includes a hanger strap 152 that is connected to and extends downwardly from ring gear 128. Pivot pins 154 extend through holes in the hanger strap 152 and connect into pivot blocks 156 of the nozzle's upper or inlet end 104. The pivot joints and pull-cable implementation of cable 142 provide a deflection system that accommodates or allows the nozzle 100 to float over obstacles during, for example, collision events, by reactively pivoting or tilting upwardly as guided by the pivot joints while the cable 142 momentarily bends without kinking due to the cable's columnar collapse in compression. When nozzle 100 travels over or is released from the obstacle, the deflection system automatically restores nozzle 100 to its original position by the pivot joints guiding movement of nozzle 100 downwardly as pushed by the airflow and/or gravity until movement is stopped by cable 142, which again puts cable 142 in tension.

Figure 6:
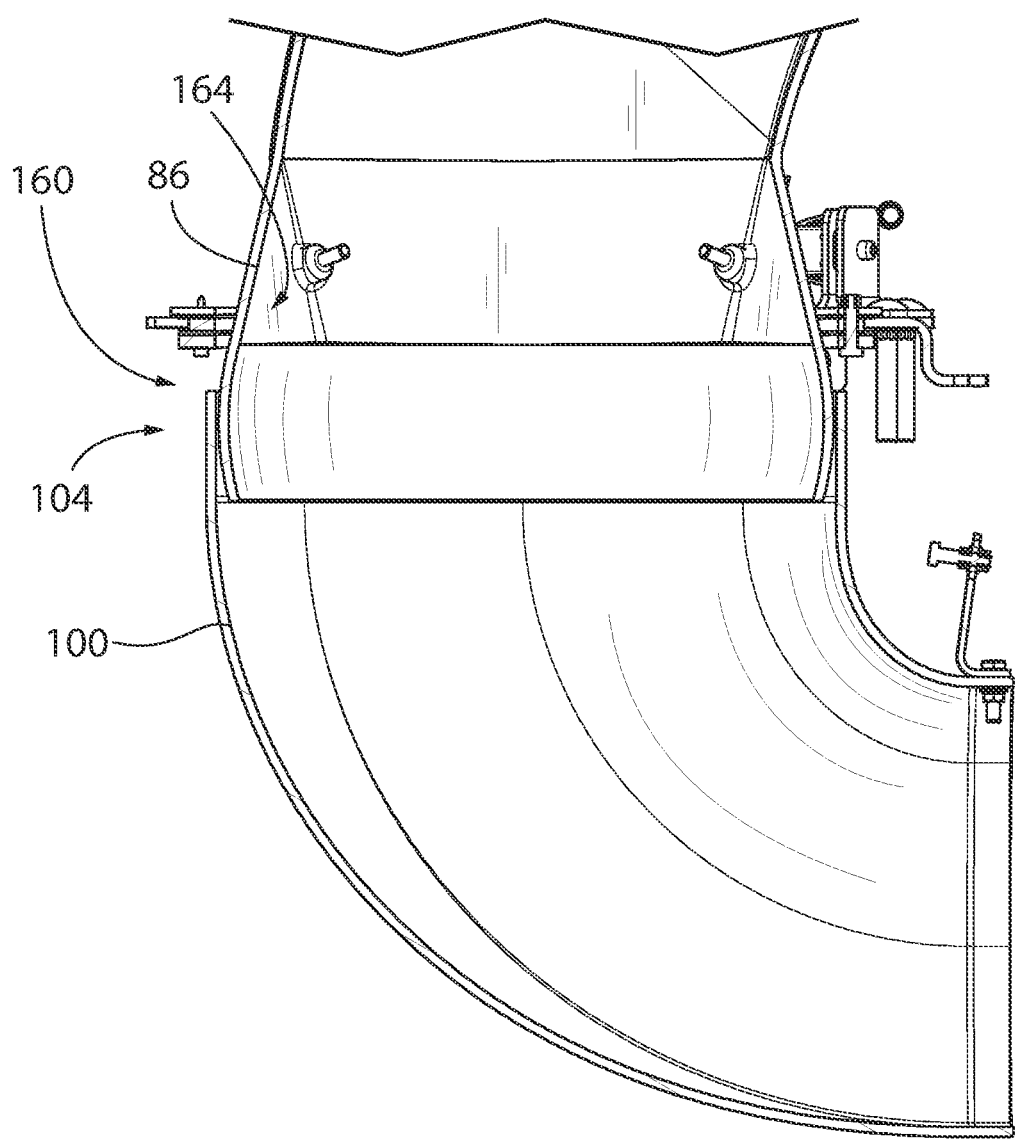
FIG. 6 is a cross-sectional and side elevation view of portions of the nozzle positioning system of FIG. 3.

Referring now to FIG. 6, a joint 160 is defined between the nozzle inlet end 104 and the housing outlet duct outlet end 86 of the duct body 82. Joint 160 is shown with duct outlet end 86 fitting concentrically inside of nozzle inlet end 104. Duct outlet end defines a flared segment 164 that, in profile, tapers outwardly and then tapers inwardly along a curved path toward its end opening. This provides a spherical or ball-and-socket type joint or fit between the bulbous segment toward the end of the duct outlet end 86 and the nozzle inlet end 104. The overlap of the nozzle inlet end 104 and the partially curved or partially toroidal outer segment of the duct outer end 86 allows the nozzle 100 to pivot over the duct outlet end through joint 160 without creating component-separating gaps through which the accelerated airflow could leak. The accelerated airflow may flow out of the nozzle 100 which a has a flow rate of about 6,500 cfm of flow at a velocity of at least about 137 mph or about 140 mph, regardless of the position of the nozzle 100. Depending on the desired end-use characteristics, blower 10 can be configured to deliver other flow rates and/or velocities, such as, for example, a flow rate of between about 3,500 cfm and 6,000 cfm and a velocity of between about 60 mph and 100 mph; between about 6,000 cfm and 7,000 cfm and a velocity of between about 100 mph and 150 mph; and between about 7,000 cfm and 8,000 cfm and a velocity of between about 150 mph and 200 mph, or less or greater values of either flow rate and/or velocity or their respective ranges, depending on implementation needs.

Figure 7:
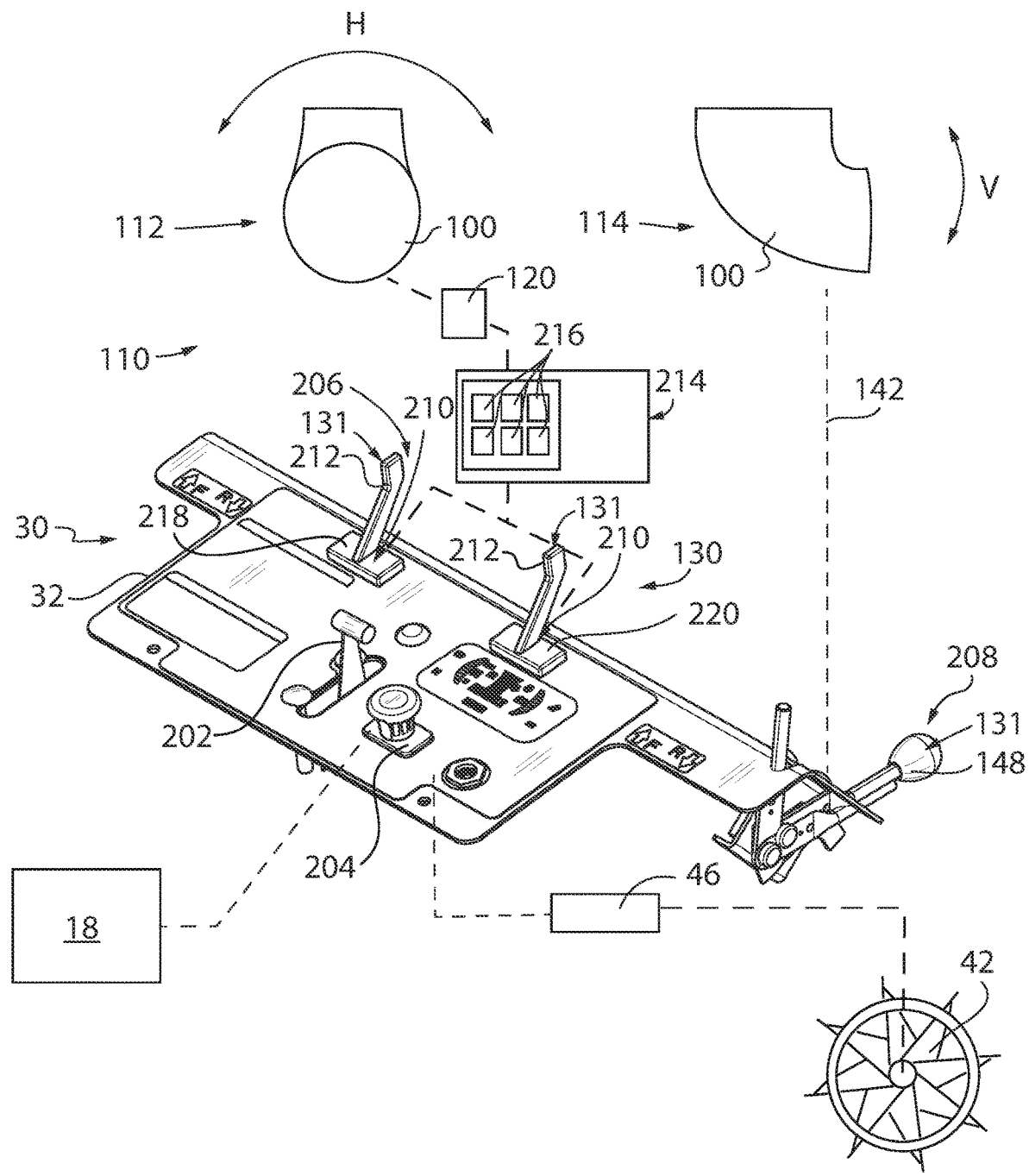
FIG. 7 is a partially schematic view of portions of a control system in accordance with an aspect of the invention.

Referring now to FIG. 7, control of the airflow delivery direction by way of nozzle direction system or nozzle positioning system 110 is partially schematically represented. Control system 30 is shown along with panel 32, to which various control devices are mounted. Shown toward a middle portion of panel 32, an engine throttle control device or engine throttle control lever 202, is mounted for controlling the speed of engine 18. A PTO switch or blower engage switch 204 is actuatable to energize the electromagnetic clutch 46 and activate/rotate impeller 42 and de-energize the electromagnetic clutch 46 and de-activate and stop rotating impeller 42. Blower engage switch 204 is shown with a knob that can be pulled out or pushed in to energize the electromagnetic clutch 46 or de-energize it, respectively.

Still referring to FIG. 7, shown toward a top portion or forward portion of panel 32, first and second sets of nozzle controls 206, 208 are implemented as control devices 131 for the nozzle rotation and tilt systems 112, 114. Control devices 131 of nozzle rotation system 112 are shown as a pair of nozzle direction control switches 210 with handles or levers 212 that are manipulated by the user to actuate the nozzle direction control switch(es) 210. Nozzle direction control switches 210 are operably connected, such as by conductors, to a rotation control system 214 of control system 30 that provides driving commands to rotation actuator 120 to selectively rotate nozzle 100 according to user commands inputted through manipulating the nozzle direction control switches 210. Rotation control system 214 may include, for example, a bank of relays 216 that are operably connected to each other and other electronic and system components to rotate the nozzle 100 to the extent desired by the user. It is understood that nozzle direction control switches 210 may directly communicate with and control the rotation actuator 120 or a computer-based rotation control system 214 may be implemented with a programmable logic controller (PLC) or other computer along with corresponding software and memory storing the software and conductors for power and signal transmission for converting user commands at the nozzle control switches 210 into desired movement of nozzle 100.

Still referring to FIG. 7, within the first set of nozzle controls 206, one of the nozzle direction control switches 210 defines an auto nozzle direction control switch 218 that provides the full rotation mode that drives or turns nozzle 100 to a full left or right position in response to a single full rotation command given by the user through the auto nozzle direction control switch 218. A single press and release of auto nozzle direction control switch 218 to the right drives rotation of nozzle 100 fully to the right to a maximum rightward-rotated position. A single press and release of auto nozzle direction control switch 218 to the left drives rotation of nozzle 100 fully to the left to a maximum left-rotated position.

Still referring to FIG. 7, also within the first set of nozzle controls 206, the other one of the nozzle direction control switches 210 defines a manual nozzle direction control switch 220 that provides the partial rotation mode that drives or turns nozzle 100 to a partial left or right position. In the partial rotation mode, nozzle 100 is rotated, for example, real-time as long as the user provides the rotation command through the manual nozzle control switch 220. Pressing and holding the manual nozzle control switch 220 to the right rotates nozzle 100 to the right until released. Pressing and holding the manual nozzle control switch 220 to the left rotates nozzle 100 to the left until released.

Still referring to FIG. 7, a second set of nozzle controls of control system 30 includes the nozzle tilt control device such as nozzle tilt control lever 148 of nozzle tilt system 114 to provide the user interface for vertically tilt nozzle 100. The nozzle direction system or nozzle positioning system 110 facilitates simultaneous horizontal/rotation and vertical/tilt adjusting. One example is that the user may command full right or left rotation of nozzle 100 through a single press and release of auto nozzle direction control switch 218. While nozzle 100 rotates to the maximum rightward-rotated or leftward-rotated position in response to the command through auto nozzle direction control switch 218, the user may also adjust the vertical/tilt position of nozzle 105 manipulating nozzle tilt control lever 148.

Many changes and modifications could be made to the invention without departing from the spirit thereof. The scope of these changes will become apparent from the appended claims.

What is claimed is:

1. A stand-on blower, comprising:
   a chassis that includes a frame;
   an engine mounted to the frame;
   a pair of drive wheels supported by the frame and selectively receiving power from the engine for moving the stand-on blower;
   a riding platform mounted to the frame and upon which an operator stands during use of the stand-on blower;
   a blower system, including:
      an impeller that selectively receives power from the engine to create an airflow for moving leaves or other debris from a lawn or other surface;
      an impeller housing that surrounds the impeller to direct a volume of air that is accelerated by the impeller in a downstream direction through the blower system as an accelerated airflow;
      an outlet nozzle that is movably mounted relative to the impeller housing and includes a nozzle outlet opening that faces different directions corresponding to movement of the outlet nozzle to direct the accelerated airflow in different directions out of the blower system, wherein the outlet nozzle defines a range of motion between a first rotational limit position that corresponds to first maximum rotational position and a second rotational limit position that corresponds to a second maximum rotational position; and
   a nozzle positioning system that is configured to move the outlet nozzle and reposition the nozzle outlet opening to vary a flow direction of the accelerated airflow with the nozzle position system having multiple operational modes, including:
      a full rotation mode that drives the outlet nozzle to one of the first and second rotational limit positions in response to a full rotation command that corresponds to a single discrete user input;
      a partial rotation mode that drives the outlet nozzle to an intermediate position that is spaced from each of the first and second rotational limit positions in response to a partial rotation command that corresponds to a real-time command to start and stop driving the outlet nozzle;

a nozzle rotation control input system having:
  a first input device that controls the full rotation mode, wherein the first input device is configured to receive the single discrete user input to drive the outlet nozzle in the full rotation mode, and
  a second input device that controls the partial rotation mode, wherein the second input device is configured to receive the real-time command to start and stop driving the outlet nozzle in the partial rotation mode.

2. The stand-on blower of claim 1, wherein the full rotation command corresponds to a single discrete user input.

3. The stand-on blower of claim 2, wherein the single discrete user input is one of a button press, a switch actuation, and a lever actuation.

4. The stand-on blower of claim 1, wherein the partial rotation command corresponds to real-time commands to start and stop driving the nozzle.

5. The stand-on blower of claim 4, wherein the real-time commands to start and stop driving the nozzle correspond to pressing and releasing a momentary switch.

6. The stand-on blower of claiml, wherein the nozzle positioning system includes a pair of rotational limit devices that limit rotation of the outlet nozzle in opposite directions.

7. The stand-on blower of claim 1,
  wherein each of the first and second input devices includes a direction control switch and a lever configured to acuate the direction control switch.

8. The stand-on blower of claim 1, wherein each of the first and second input devices includes at least one of a switch, a knob, a handle, a button, and a lever.

9. The stand-on blower of claim 1, wherein the positioning system includes a nozzle rotation system that is configured to vary a horizontal facing direction of the nozzle outlet opening about a swept facing direction of at least 180 degrees.

10. The stand-on blower of claim 1, wherein the nozzle positioning system comprises a nozzle tilt system that is configured to vary a vertical facing direction of the nozzle outlet opening.

11. The stand-on blower of claim 10, wherein the nozzle tilt system includes a tilt actuator that is configured to pivot the outlet nozzle about a horizontal pivot axis to vary the vertical facing direction of the nozzle outlet opening.

12. The stand-on blower of claim 11, wherein the tilt actuator includes a cable that is connected to the outlet nozzle and is configured to push and/or pull the outlet nozzle to pivot the outlet nozzle about the pivot axis.

13. The stand-on blower of claim 12, further comprising a deflection system that accommodates reactive movement of the nozzle away from a pre-collision position in response to a collision between the nozzle and an obstacle.

14. The stand-on blower of claim 13, wherein the deflection system allows tilting of the nozzle about the pivot axis in response to the collision between the nozzle and the obstacle.

15. The stand-on blower of claim 14, wherein the cable is a pull-only cable configured to move or hold the nozzle when in tension and momentarily bend under compression induced by the tilting of the nozzle during the collision between the nozzle and the obstacle.

16. A stand-on blower, comprising:
  a chassis that includes a frame;
  an engine mounted to the frame;
  a pair of drive wheels supported by the frame and selectively receiving power from the engine for moving the stand-on blower;
  a pair of casters pivotally attached to the frame, each caster defining a pivot axis at a respective attachment location;
  a riding platform mounted to the frame and upon which an operator stands during use of the stand-on blower;
  a blower system, including:
    an impeller housing that surrounds an impeller to direct a volume of air that is accelerated by the impeller in a downstream direction through the blower system;
    a housing outlet duct that extends between the impeller housing and an outlet nozzle, the housing outlet duct defining a duct body that extends in a scroll fashion angularly forward from the impeller housing with:
      a housing outlet duct inlet end extending tangentially from the impeller housing;
      a housing outlet duct outlet end arranged forward of the housing outlet duct inlet end and the impeller housing; and
    the outlet nozzle movably connected to the housing outlet duct outlet end and rotatable about a vertical axis that is positioned forward of each of the pivot axes of the pair of casters.

17. The stand-on blower of claim 16, further comprising a ball-and-socket joint that provides an interface between the housing outlet duct outlet end and the nozzle.

18. The stand-on blower of claim 16, further comprising a nozzle positioning system that is configured to move the outlet nozzle to vary a delivery direction of an airflow exiting the nozzle; wherein nozzle position system defines multiple operational modes, including:
  a full rotation mode that drives the outlet nozzle to a full left position or a full right position in response to a full left or full right rotation command; and
  a partial rotation mode that drives the outlet nozzle to a position that is between the full left and full right positions in response to a partial rotation command.

19. The stand-on blower of claim 18, further comprising a control system having:
  a first set of controls that includes:
    an auto nozzle direction control switch that controls nozzle rotation in the full rotation mode to drive the outlet nozzle to the full left position or the full right position;
    a manual nozzle direction control switch that controls nozzle rotation in the partial rotation mode to drive to nozzle to the position that is between the full left and full right positions;
  a second set of controls that includes:
    a nozzle tilt control device that controls a vertical tilt position of the nozzle.

20. The stand-on blower of claim 16, further comprising:
  an outlet nozzle that is movably mounted relative to the impeller housing;
  a nozzle positioning system that is configured to move the outlet nozzle for varying a flow direction of the volume of air, wherein nozzle position system defines multiple operational modes, including:
    a full rotation mode that drives the outlet nozzle to a predetermined rotational limit in response to a full rotation command that corresponds to a single discrete user input; and
    a partial rotation mode that drives the outlet nozzle to a position that is spaced from the rotational limit in response to a partial rotation command that corresponds to real-time commands to start and stop driving the nozzle.

21. A stand-on blower, comprising:
a chassis that includes a frame;
an engine mounted to the frame;
a pair of drive wheels supported by the frame and selectively receiving power from the engine for moving the stand-on blower;
a pair of casters pivotally attached to the frame, each caster defining a pivot axis at a respective attachment location;
a riding platform mounted to the frame and upon which an operator stands during use of the stand-on blower;
a blower system, including:
    an impeller housing that surrounds an impeller to direct a volume of air that is accelerated by the impeller in a downstream direction through the blower system;
    a housing outlet duct that extends between the impeller housing and an outlet nozzle, wherein:
        the housing outlet duct extends angularly forward from the impeller housing with:
            a housing outlet duct inlet end connected to and receiving an airflow from the impeller housing
            a housing outlet duct outlet end arranged forward of the housing outlet duct inlet end and the impeller housing and defining a downwardly-facing opening;
    the outlet nozzle defines an inlet end with an upwardly-facing opening that receives the airflow from the downwardly-facing opening of the housing outlet duct; and
    the outlet nozzle is configured to rotate about a vertical axis that:
        extends through the housing outlet duct downwardly-facing opening;
        extends through the outlet nozzle upwardly-facing opening; and
        is positioned forward of each of the pivot axes of the pair of casters.

* * * * *